(12) United States Patent
Koizumi et al.

(10) Patent No.: US 11,065,987 B2
(45) Date of Patent: Jul. 20, 2021

(54) SEAT SLIDE DEVICE FOR VEHICLE

(71) Applicants: TF-METAL Co., Ltd., Kosai (JP);
TACHI-S CO., LTD., Tokyo (JP)

(72) Inventors: Norifumi Koizumi, Hamamatsu (JP);
Hidekazu Kubota, Akishima (JP)

(73) Assignees: TF-METAL CO., LTD., Kosai (JP);
TACHI-S CO., LTD., Tokyo (JP)

( * ) Notice: Subject to any disclaimer, the term of this patent is extended or adjusted under 35 U.S.C. 154(b) by 0 days.

(21) Appl. No.: 16/660,954

(22) Filed: Oct. 23, 2019

(65) Prior Publication Data

US 2020/0130539 A1    Apr. 30, 2020

(30) Foreign Application Priority Data

Oct. 29, 2018   (JP) .............................. JP2018-202400

(51) Int. Cl.
*B60N 2/075* (2006.01)
*B60N 2/07* (2006.01)
*B60N 2/08* (2006.01)

(52) U.S. Cl.
CPC ......... *B60N 2/0725* (2013.01); *B60N 2/0715* (2013.01); *B60N 2/0727* (2013.01); *B60N 2/08* (2013.01)

(58) Field of Classification Search
CPC . B60N 2/06; B60N 2/067; B60N 2/07; B60N 2/0702
USPC ........................................ 248/424, 429, 430
See application file for complete search history.

(56) References Cited

U.S. PATENT DOCUMENTS

| | | | |
|---|---|---|---|
| 9,751,431 B2 * | 9/2017 | Walter | B60N 2/0705 |
| 10,011,195 B2 * | 7/2018 | Kume | B60N 2/0722 |
| 10,144,310 B1 * | 12/2018 | Ferenc | B60N 2/067 |
| 10,710,476 B2 * | 7/2020 | Taniguchi | B60N 2/0881 |
| 2008/0238168 A1 | 10/2008 | Kojima et al. | |
| 2010/0207419 A1 * | 8/2010 | Kojima | B60N 2/0727 |
| | | | 296/65.13 |
| 2016/0144746 A1 * | 5/2016 | Couasnon | B60N 2/0705 |
| | | | 384/34 |

FOREIGN PATENT DOCUMENTS

| | | |
|---|---|---|
| JP | 2006-35910 A | 2/2006 |
| JP | 2008-265723 A | 11/2008 |
| JP | 2016-47659 A | 4/2016 |
| JP | 2018-58576 A | 4/2018 |

* cited by examiner

*Primary Examiner* — Steven M Marsh
(74) *Attorney, Agent, or Firm* — Foley & Lardner LLP

(57) ABSTRACT

In the present invention, in a bottom portion 4a of a lower rail 4, a foreign matter interference portion 27 protruding upward and having a substantially arc-circular shape in a side view is formed by being cut and raised in a middle part in a rail width direction more on a front side than a bolt hole 26 for a mounting bolt for fixing the rear end portion of the lower rail 4 to a vehicle body. Rear-side stoppers 29 and long hole portions 31 shared with the rear-side stoppers 29 are formed on both sides of the foreign matter interference portion 27. The foreign matter interference portion 27 is separated into a front-side tongue piece 27a and a rear-side tongue piece 27b by a slit 32.

6 Claims, 9 Drawing Sheets

SEAT SLIDE DEVICE FOR VEHICLE

BACKGROUND

The present invention relates to a seat slide device for a vehicle which slidably movably supports a seat for adjusting the position of the seat to be mounted on the vehicle.

As is well known, a seat slide device for a vehicle for manually adjusting the position of a seat is provided with a lower rail fixed to a vehicle body floor part, and with an upper rail on which the seat is mounted and which is slidably fitted to the lower rail.

In such a seat slide device, in a state in which the upper rail (seat) has slid to the most advanced position with respect to the lower rail, the lower rail having a U-shape in cross section becomes a state of being opened upward. There is therefore possibility that a foreign matter, such as a lighter, dropped by an occupant enters into the inside of the lower rail.

In such a state, when the upper rail slides backward, the foreign matter is caught between a bolt which fixes the lower rail to the vehicle floor part and the rear end of the upper rail. To smoothly remove the foreign matter toward the rear side of the lower rail following the movement of the upper rail by preventing the catching of the foreign matter, a foreign matter interference member is provided to the lower rail.

For example, in Japanese Patent Application Publication No. 2016-47659 (hereinafter is referred to as "JP2016-47659"), a foreign matter interference member (foreign matter discharge/peeling prevention member 61) made of spring steel is fixed to the bottom portion of a lower rail by caulking of a pin (see FIG. 3 of JP2016-47659).

In addition, in Japanese Patent Application Publication No. 2008-265723 (hereinafter is referred to as "JP2008-265723"), a foreign matter interference member (a block body 31 having a slide-like shape) made of resin is fixed to the bottom portion of a lower rail by a so-called pawl fitting method.

Moreover, in Japanese Patent Application Publication No. 2006-35910 (hereinafter is referred to as "JP2006-35910"), a hemispherical protruding portion (a dowel 30) on which a foreign matter, such as a coil, can run is integrally formed with the bottom portion of a lower rail so as to be adjacent to a rivet or a bolt which connects the lower rail with a bracket (see FIG. 6 and FIG. 7 of JP2006-35910).

SUMMARY

However, in the structure of JP2016-47659, since the foreign matter interference member made of spring steel is adopted, cost increases. In addition, since the pin for positioning the lower rail to the vehicle body floor part also serves as a fixing means of the foreign matter interference member to the lower rail, it is necessary to separately provide the pin and the fixing means of the foreign matter interference member depending on restriction on a layout. Consequently, cost may further increase due to an increase in the number of components.

In addition, in the structure of JP2008-265723, since the foreign matter interference member made of resin is fixed to the lower rail by the pawl fitting method, as compared with a case of fixing it by a caulking method and a welding method, the foreign matter interference member easily comes off, and there is therefore room for improving position stability of the foreign matter interference member.

Moreover, in the structure of JP2006-35910, even if the hemispherical protruding portion is integrally formed with the bottom portion of the lower rail so as to be adjacent to a specific rivet or bolt, in a case where the height of the head of the rivet or bolt is high, or in a case where a material having high tensile is adopted to the lower rail, a protruding portion having a sufficient height cannot be formed. Consequently, there is possibility that an original foreign matter interference effect and foreign matter discharging effect cannot be obtained.

In view of the foregoing, it is desirable to provide a seat slide device for a vehicle which is capable of obtaining a sufficient foreign matter discharging effect while loosening various restrictions in the technique of JP2006-35910, and of obtaining a sufficient strength and rigidity of a lower rail even if a foreign matter interference portion is provided thereto, while assuming that the foreign matter interference portion is formed integrally with the lower rail.

According to one aspect of the present invention, a seat slide device for a vehicle includes: a lower rail having a substantially U-shape in cross section whose front and rear end portions in a longitudinal direction thereof are fixed to a vehicle body by fixing members and whose upper surface is opened; an upper rail fitted to the lower rail so as to be slidably movable in the longitudinal direction; a lock mechanism used for locking and unlocking a position of the upper rail at a time of a positional adjustment of the upper rail with respect to the lower rail; and stroke regulation stoppers for regulating a positional adjustment range of the upper rail with respect to the lower rail, wherein, in a bottom wall portion of the lower rail, a foreign matter interference portion protruding upward and having a substantially arc-circular shape in a side view is formed by being cut and raised in a middle part in a rail width direction more on a front side than a fixing member for fixing a rear end portion of the lower rail to the vehicle body, and wherein the foreign matter interference portion is separated into a front-side tongue piece and a rear-side tongue piece.

DETAILED DESCRIPTION

Figure 1:
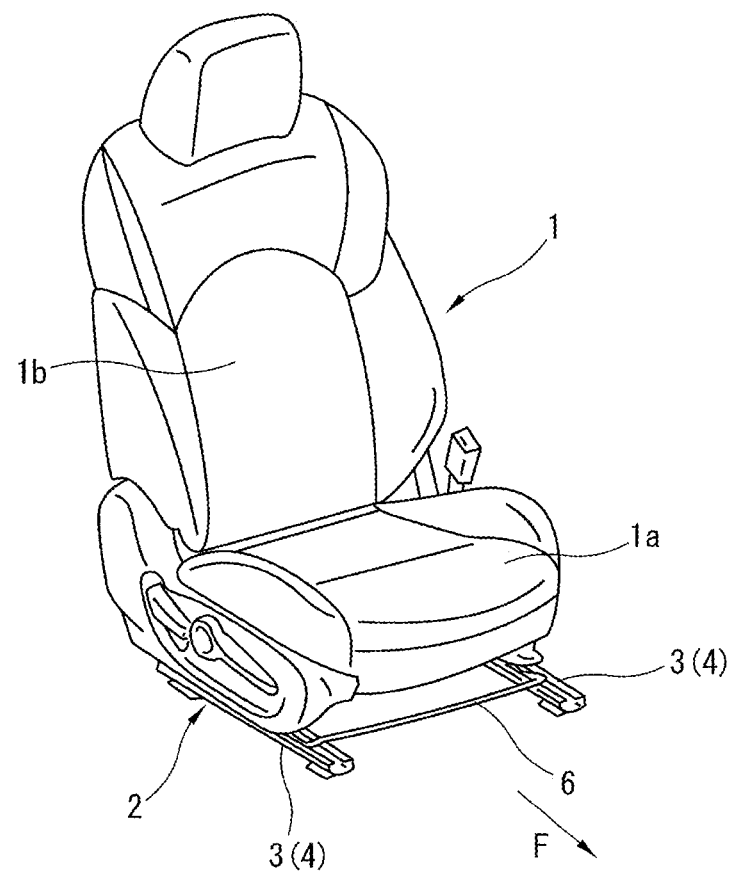
FIG. 1 is a perspective view showing one example of a seat for a vehicle which includes a first embodiment of a seat slide device according to the present invention.

FIG. 1 to FIG. 7(b) specifically show a first embodiment of a seat slide device according to the present invention. In particular, FIG. 1 shows one example of a seat for a vehicle (hereinafter is simply referred to as "seat") including a seat slide device of the present embodiment. Here, an arrow F in FIG. 1 shows a vehicle front direction.

As shown in FIG. 1, a seat 1 configured of a seat cushion 1a and a seat back 1b is mounted on a seat slide device 2. The seat slide device 2 is configured of a pair of seat rails 3 as a main element which is located on right and left sides and extends in the longitudinal direction of the vehicle. The structure of the seat rail 3 on the right side is the same as that of the seat rail 3 on the left side, and they are arranged so as to be parallel to each other in the width direction of the vehicle.

As mentioned below, each of the seat rails 3 is configured of a lower rail 4 and an upper rail 5 slidably fitted to the lower rail 4. The seat 1 is fixed to the upper rails 5, and the lower rails 4 are fixed to the floor part of a vehicle body. Then, for example, by a pull-up operation of an operation handle 6 attached to the seat slide device 2, a lock state of the upper rails 5 to the lower rails 4 is released, and the positional adjustment in the longitudinal direction of the seat 1 becomes possible.

Figure 2:
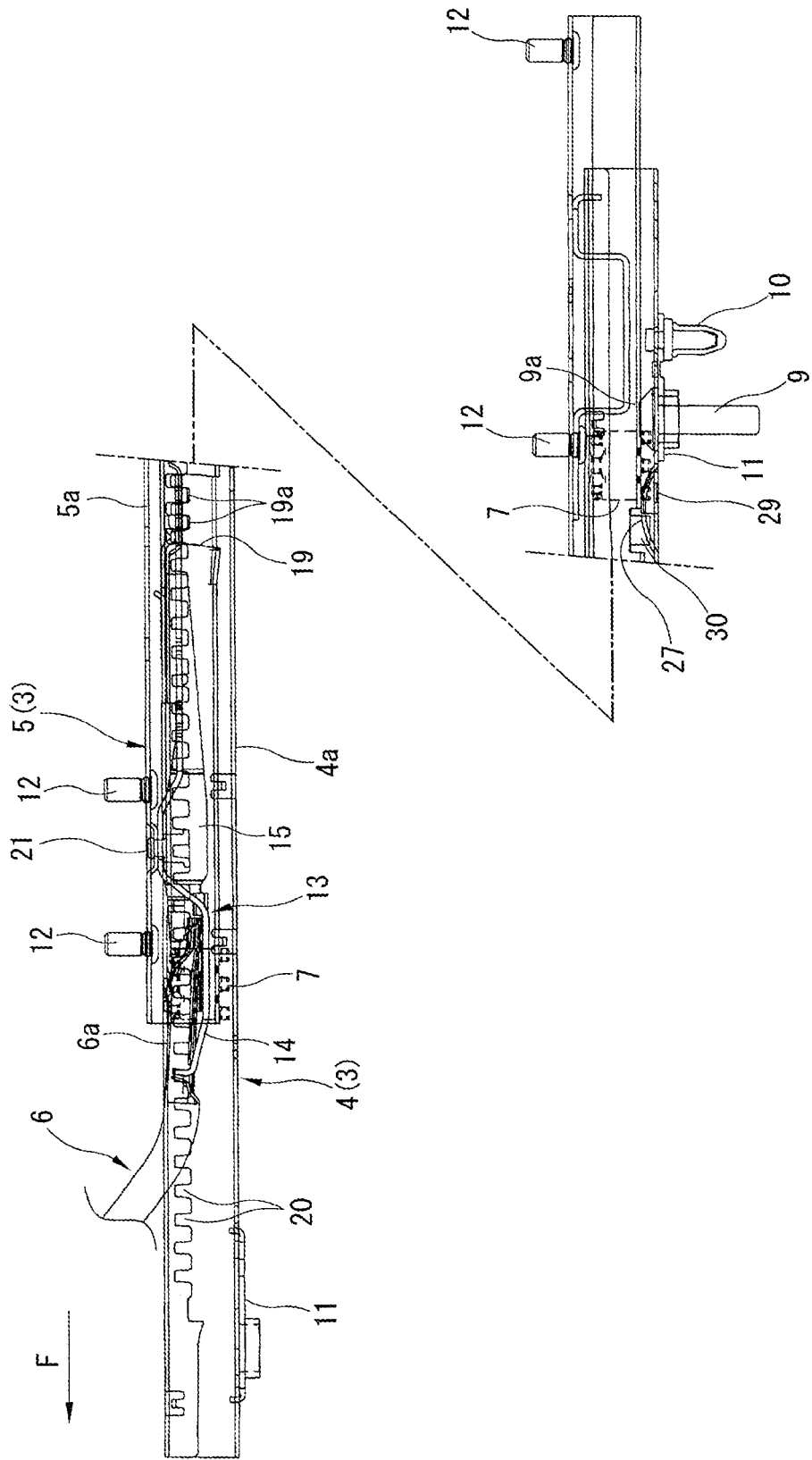
FIG. 2 is a sectional view showing the details of one of a pair of seat rails for the seat slide device shown in FIG. 1 in a state in which an upper rail is located at the most backward position.
Figure 3:
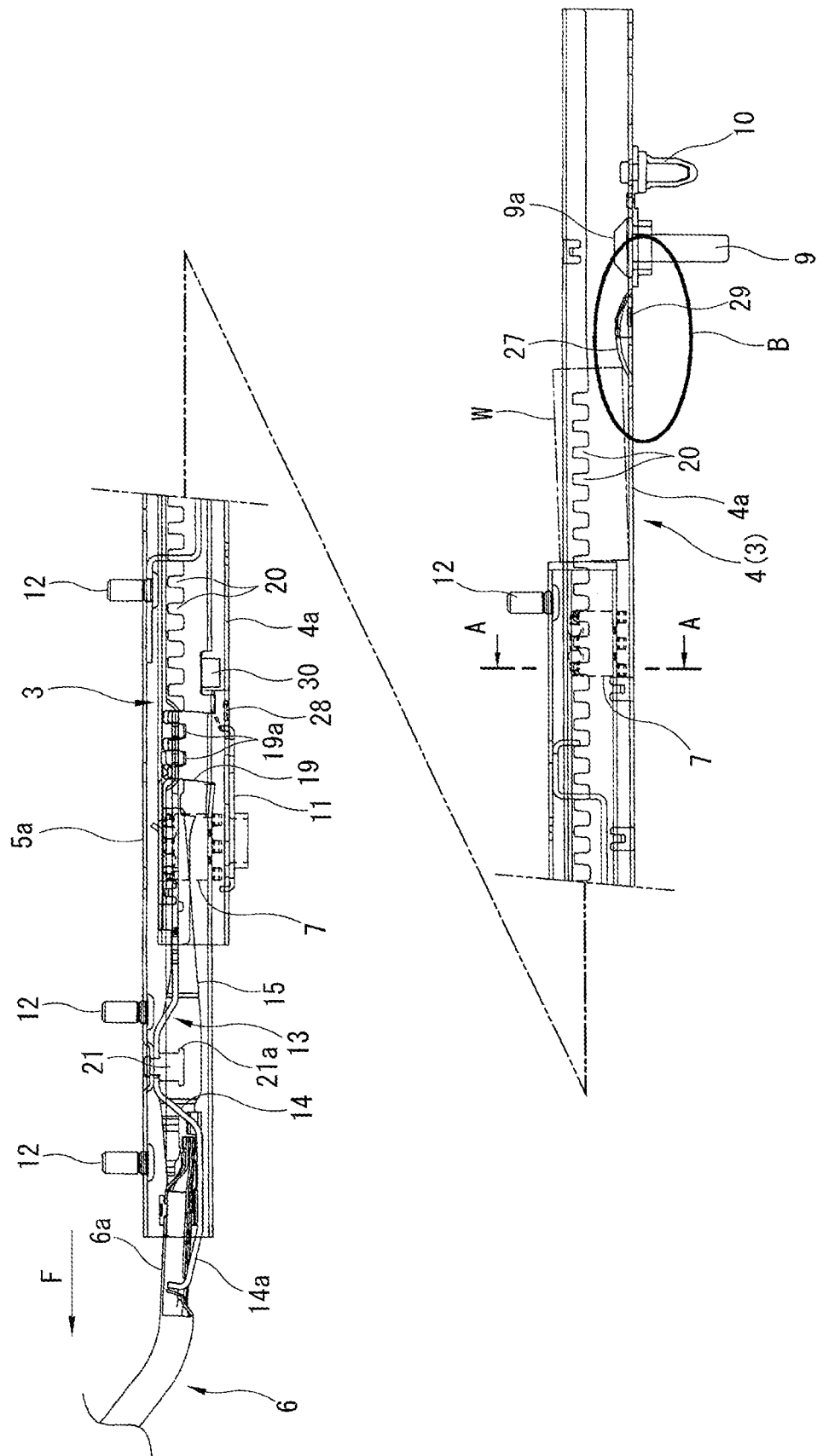
FIG. 3 is a sectional view showing the details of one of the seat rails in a state in which the upper rail is located at the most advanced position.
Figure 4:
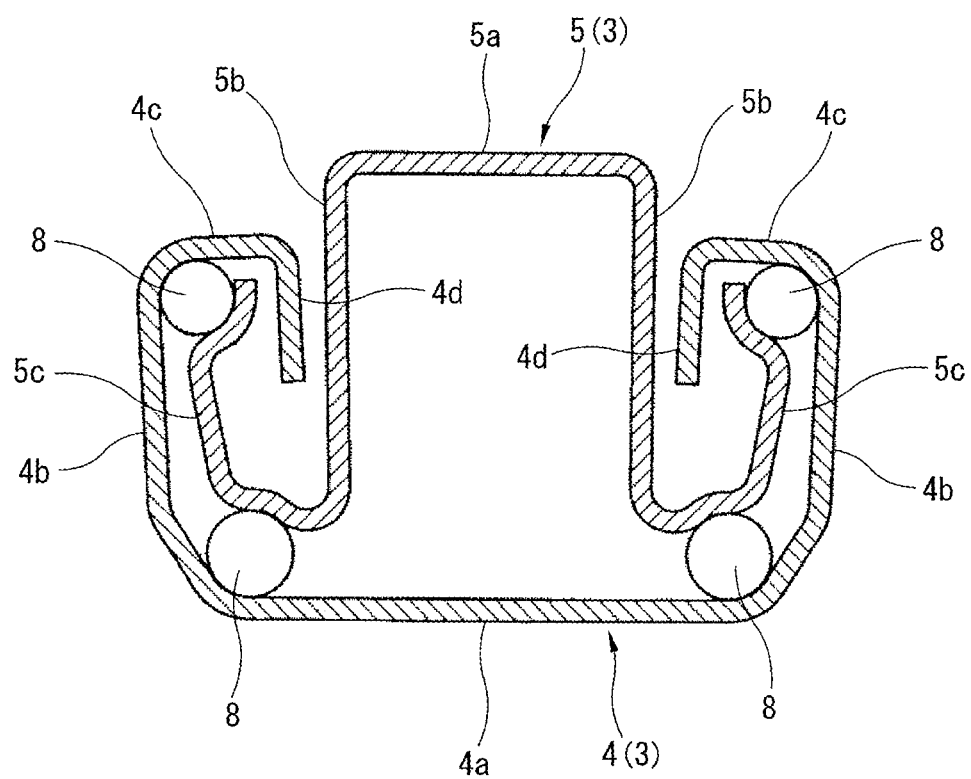
FIG. 4 is an enlarged sectional view taken along a line A-A of the seat rail shown in FIG. 3.

Each of FIG. 2 and FIG. 3 is a sectional view showing the details of one of the seat rails 3 shown in FIG. 1. FIG. 2 shows a state in which an upper rail 5 is moved backward to the most backward position with respect to a lower rail 4. FIG. 3 shows a state in which the upper rail 5 is advanced to the most advanced position with respect to the lower rail 4. In addition, FIG. 4 is an enlarged sectional view taken along a line A-A of FIG. 3. Here, similar to FIG. 1, an arrow F in each of FIG. 2 and FIG. 3 shows a vehicle front direction.

As shown in FIG. 2 to FIG. 4, the seat rail 3 is configured of the lower rail 4 and the upper rail 5 fitted to and held by the lower rail 4 so as to be slidably movable in the longitudinal direction with respect to the lower rail 4.

As is clear from FIG. 4, the lower rail 4 is formed in a substantially U-shape in cross section by bending a metal plate such that the upper surface thereof is opened. The lower rail 4 includes a bottom wall portion 4a, side wall portions 4b located on both of the sides thereof, and downward erect wall portions 4d formed by bending opening end sides of the side wall portions 4b inward through connecting portions 4c.

On the other hand, the upper rail 5 slidably fitted to and held by the inside of the lower rail 4 is formed in a substantially U-shape in cross section by bending a metal plate such that the lower surface thereof is opened. The upper rail 5 includes a top wall portion 5a, side wall portions 5b located on both of the sides thereof, and curved wall portions 5c formed by bending opening end sides of the side wall portions 5b upward while curving them outward. In addition, in consideration with strength required for the lower rail 4 and the upper rail 5, as a material used for them, for example, a high-tensile steel having a tensile strength of 590 MPa or greater is used. In particular, in recent years, a high-tensile steel having a tensile strength of 980 MPa has been used in order to reduce weight.

When the upper rail 5 is slidably assembled to the lower rail 4, as shown in FIG. 4, the upper rail 5 is fitted to the lower rail 4 such that the curved wall portions 5c of the upper rail 5 are sandwiched between the side wall portions 4b and the erect wall portions 4d on the both sides in the width direction of the lower rail 4. In addition, a plurality of steel balls 8 serve as rolling elements held by ball retainers 7 which are independently disposed on the right and left sides in the rail width direction of the seat rails 3. The steel balls 8 are interposed between the lower rail 4 and the upper rail 5. In addition, in FIG. 4, the ball retainers 7 are omitted.

As shown in FIG. 2 and FIG. 3, a pair of right and left ball retainers 7 each having a substantially rectangular shape is provided to each of the front end portion and the rear end portion of the seat rail 3, and four steel balls 8 are held by each of the retainers 7. Then, the steel balls 8 roll following the slide movement of the upper rail 5, and thereby a function equivalent to that of a so-called linear motion bearing can be obtained. In addition, although each of the ball retainers 7 holding the steel balls 8 can be slidably moved following the movement of the upper rail 5, the position of each of the ball retainers 7 is regulated so as not to deviate from the range in which the lower rail 4 is overlapped with the upper rail 5 in the longitudinal direction.

As mentioned above, the lower rail 4 assembled with the upper rail 5 is fixed to the floor part of the vehicle body through mounting bolts 9 and locating pins 10 (see FIG. 2 and FIG. 3) serving as fixing members which are disposed on the front and rear end portions, and in addition to them it is fixed through brackets 11. In addition, a mounting bolt to be inserted into the bracket 11 located on the front side of the lower rail 4 is omitted in the drawings. In addition, in a case where the lower rail is fixed to the vehicle body through leg members which are not shown in the drawings instead of the brackets 11, the lower rail 4 and the leg members may be fixed to each other by using rivets instead of the mounting bolts 9.

In addition, a seat frame on the seat cushion 1a side in the seat 1 mentioned above is fixed to upper rails 5 through a plurality of mounting bolts 12 shown in FIG. 2 and FIG. 3. Then, as shown in FIG. 1, a pipe-shaped operation handle 6 having a substantially U-shape in plane view is connected so as to extend over the upper rails 5 of seat rails 3.

As shown in FIG. 2 and FIG. 3, the upper rail 5 is provided with a lock mechanism 13 used for locking and unlocking at the time of the positional adjustment in the longitudinal direction of the seat 1. This lock mechanism 13 is similar to that described in Japanese Patent Application Publication No. 2018-58576 previously applied by the present applicant, and only an outline thereof will be explained.

The lock mechanism 13 shown in FIG. 2 and FIG. 3 is roughly configured of a lock member 14 disposed in the front end portion of the upper rail 5, a release lever 15 disposed such that a part in the longitudinal direction thereof overlaps with the lock member 14 in the front end portion of the upper rail 5, and of the operation handle 6 in FIG. 1 which is inserted into and connected to the front end portions of the lock member 14 and the release lever 15, as main elements. The outline of the lock member 14 that is a main element of the lock mechanism 13 is shown in FIG. 5, and the outline of the release lever 15 is shown in FIG. 6.

Figure 5:
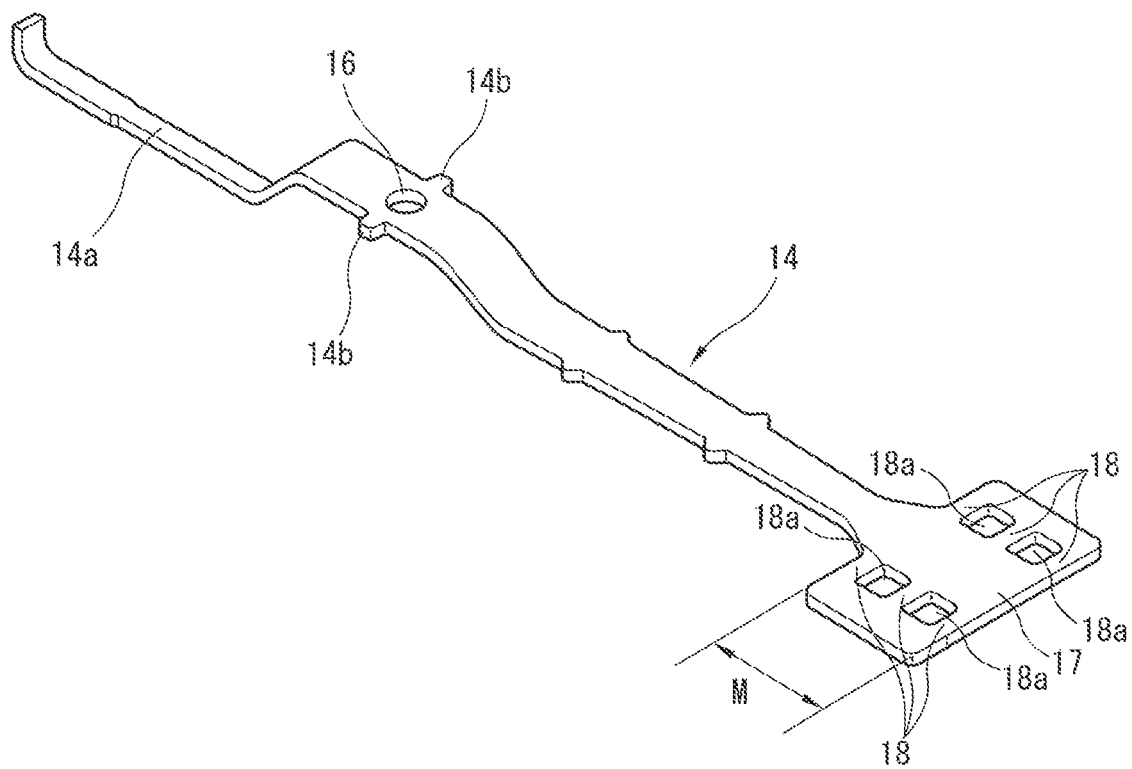
FIG. 5 is a perspective view schematically showing a lock lever that is a constituent of a lock mechanism shown in FIG. 2 and FIG. 3.
Figure 6:
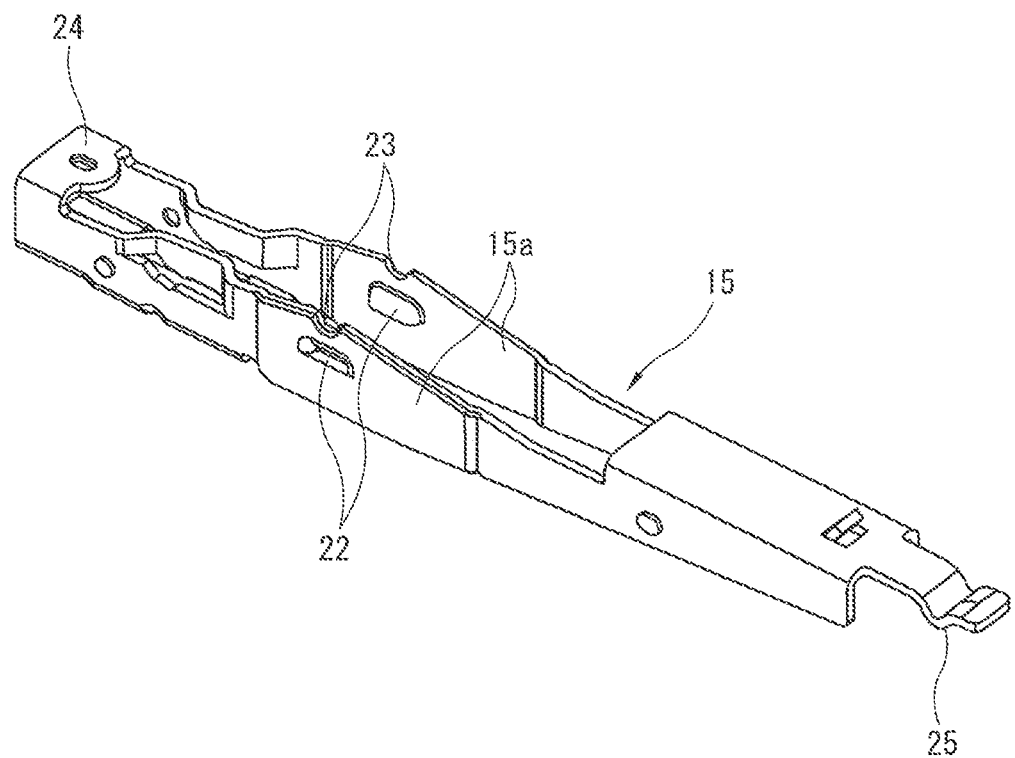
FIG. 6 is a perspective view schematically showing a releasing lever that is a constituent of the lock mechanism shown in FIG. 2 and FIG. 3.

The lock member 14 is made of, for example, spring steel, and, as shown in FIG. 5, has a substantially long narrow flat-bar shape. A mounting hole 16 that becomes a mounting portion is formed in the middle part in the longitudinal direction of the lock member 14. In addition, the rear end portion of the lock member 14 is a wide flat portion 17, and a plurality of lock holes 18a are formed to the flat portion 17 so as to be arranged in the rail-longitudinal direction of the upper rail 5. Consequently, a plurality of ladder-tooth-shaped lock teeth 18 are formed.

As shown in FIG. 2 and FIG. 3, a cutout portion 19 which can receive a longitudinal length M of the flat portion 17 including the plurality of the lock teeth 18 is formed to each of the side wall portions 5b of the upper rail 5, in correspondence with the lock teeth 18 of the lock member 14. In addition, pawl portions 19a which are capable of engaging with the respective lock holes 18a of the lock member 14 are formed at the upper edge of the cutout portion 19 so as to protrude downward from the upper edge in order to engage with them, and the number of the pawl portions 19a (in the present embodiment, two pawl portions) corresponds to that of the lock holes 18.

Similarly, a plurality of lock grooves 20 are formed along the longitudinal direction of each of the erect wall portions 4d of the lower rail 4 at the same pitch as the lock teeth 18 of the lock member 14, in correspondence with the lock teeth 18 of the lock member 14. Consequently, as mentioned below, the plurality of the lock teeth 18 engaging with the cutout portion 19 of the upper rail 15 mesh with the lock grooves 20 of the lower rail 4 at the same time, and thereby the upper rail 5 is locked so as not to slidably move with respect to the lower rail 4.

As shown in FIG. 2 and FIG. 3, a rivet 21 equipped with, at the lower part thereof, a large-diameter flange portion 21a (see FIG. 3) is inserted so as to extend through the mounting hole 16 of the lock member 14 and the top wall portion 5a of the upper rail 5, and caulking is carried out from the upper surface side of the top wall portion 5a. With this, the lock member 14 is fixed to the top wall portion 5a of the upper rail 5.

As shown in FIG. 6, the release lever 15 is formed in a deformed box shape so as to sandwich a part other than a front end portion 14a and the lock teeth 18 of the lock member 14 from both sides. Engaging projection portions 22 projecting inward are formed to respective side wall portions 15a of the release lever 15. Moreover, recessed portions 23 are formed in the middle parts in the longitudinal directions on the upper end surfaces of the respective side wall portions 15a.

The Engaging projection portions 22 of the release lever 15 are disposed to be located above the flange portion 21a of the rivet 21 shown in FIG. 2 and FIG. 3, and the recessed portions 23 are swingably supported on respective projection portions 14b of the lock member 14 shown in FIG. 5. In addition, a channel portion 24 is formed to the front end portion of the release lever 15, and a curved projection portion 25 is formed to the rear end portion of the release lever 15 by being bent. This curved projection portion 25 is formed so as to come in contact with the upper surface of the flat portion 17 of the lock member 14 shown in FIG. 5. Then, as shown in FIG. 2 and FIG. 3, a rear end connection portion 6a of the operation handle 6 is fitted and connected to the channel portion 24 of the release lever 15.

In the longitudinal direction of the upper rail 5 shown in FIG. 2 and FIG. 3, by the front end portion 14a and the flat portion 17 of the lock member 14, the channel portion 24 and the curved projection portion 25 of the release lever 15 are urged upward. With this, the recessed portions 23 of the release lever 15 are pressed to the respective projection portions 14b of the lock member 14. Accordingly, without contact of the locking projection portions 22 with the flange portion 21a of the rivet 21, the release lever 15 can be swingably displaced with the projection portions 14b as a fulcrum.

In such a structure of the lock mechanism 13, a locked state is shown in FIG. 2 and FIG. 3, and when the operation handle 6 shown in FIG. 1 is pulled up from this locked state, the release lever 15 is swingably displaced clockwise in FIG. 2 and FIG. 3 with the projection portions 14b of the lock member 14 as a fulcrum. Accordingly, the flat portion 17 of the lock member 14 is pushed downward by the curved projection portion 25 of the rear end portion of the release lever 15, the plurality of the lock teeth 18 come off from the lock grooves 20, and then the lock mechanism 13 becomes in an unlocked state (lock released state).

With this, the slide movement of the upper rail 5 with respect to the lower rail 4 and the positional adjustment in the longitudinal direction of the seat 1 shown in FIG. 1 becomes possible. In addition, when the pulling-up operation force of the operation handle 6 is released, by the spring force of the lock member 14 itself, the lock member 14 and the release lever 15 are returned to the locked state soon.

The structure of the locked mechanism 13 is just one example, and if the same function can be exhibited, another type of a lock mechanism can be adopted.

FIG. 7(a) shows an enlarged plane view of a part B of FIG. 3, and FIG. 7(b) shows a sectional view taken along a line C-C of FIG. 7(a). In addition, in FIGS. 7(a) and 7(b), the mounting bolts 9 shown in FIG. 2 and FIG. 3 are omitted.

As shown in FIG. 7(a) and FIG. 7(b), in the bottom wall portion 4a of the lower rail 4, a foreign matter interference portion 27 is formed on the front side of a mounting hole 26, so as to be adjacent to the mounting hole 26 through which a corresponding one of the mounting bolts 9 as a fixing member shown in FIG. 2 and FIG. 3 is inserted. As shown in FIG. 3, this foreign matter interference portion 27 is provided to discharge a foreign matter W, such as a lighter, dropped by an occupant in a case of entering into the inside of the lower rail 4, in a state in which the upper rail 5 with respect to the lower rail 4 is located at the most advanced position.

That is, in order to serve to guide the foreign matter W so as to be smoothly discharged to the rear side of the mounting bolt 9, the foreign matter interference portion 27 is provided such that the foreign matter W runs on a head portion 9a of the mounting bolt 9 disposed adjacent to the foreign matter interference portion 27 as an introduction portion, in a case where the upper rail 5 is moved backward while the foreign matter W enters into the lower rail 4. Therefore the foreign matter interference portion 27 is preferably formed to extend to the same height position as the head portion 9a of the mounting bolt 9. In addition, in consideration of a case where, as mentioned above, the foreign matter W passes over the head portion 9a, the head portion 9a having a flat cone trapezoidal shape is adopted.

More specifically, as shown in FIG. 2 and FIG. 3, a front-side stopper 28 and a rear-side stopper 29 that become fixing sides as stoppers for regulating the stroke of the upper rail 5 with respect to the lower rail 4 are respectively formed to the front portion and the rear portion of the lower rail 4. These front-side stopper 28 and rear-side stopper 29 are each formed as a pair facing each other in the rail width direction by cutting and raising a part of the bottom wall portion 4a of the lower rail 4 obliquely upward.

On the other hand, as shown in FIG. 2, FIG. 3 and FIG. 4, in correspondence with the front-side stopper 28 and the rear-side stopper 29 of the lower rail 4, a movable-side stopper 30 is formed in the middle part in the longitudinal direction of the upper rail 5. This movable-side stopper 30 is formed as a pair facing each other in the rail width direction, and extends downward, so as to interfere with the front-side stopper 28 and the rear-side stopper 29.

Therefore, as shown in FIG. 2, when the upper rail 5 is moved to the most backward position, the movable-side stopper 30 comes in contact with the rear-side stopper 29, and the position of the upper rail 5 is regulated at the most backward position. Similarly, as shown in FIG. 3, when the upper rail 5 is moved to the most advanced position, the movable-side stopper 30 comes in contact with the front-side stopper 28, and the position of the upper rail 5 is regulated at the most advanced position.

Figure 7:
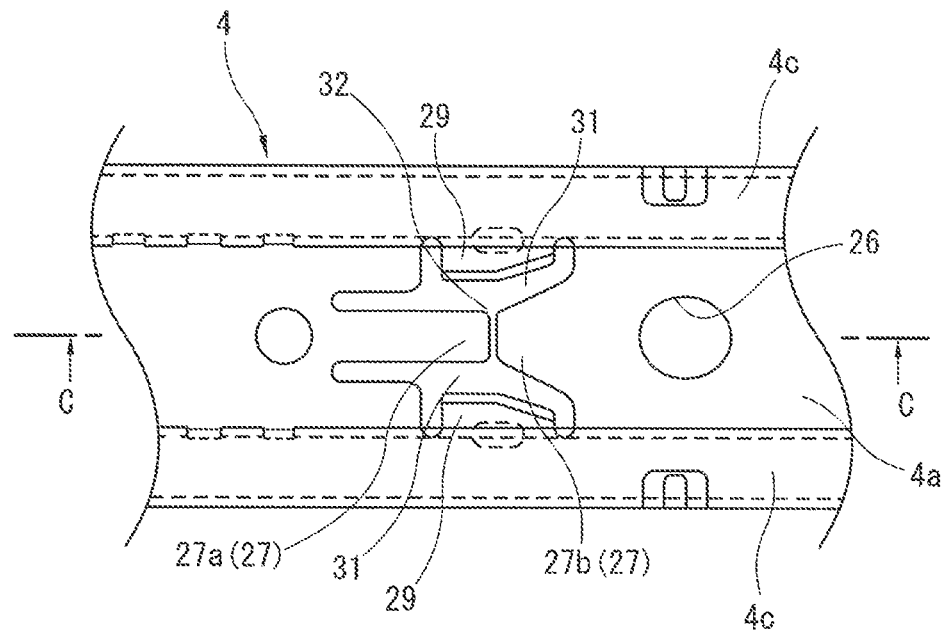
FIG. 7(a) is an enlarged plane view of a part B of FIG. 3.
FIG. 7(b) is a sectional view taken along a line C-C of FIG. 7(a).
Figure 7:
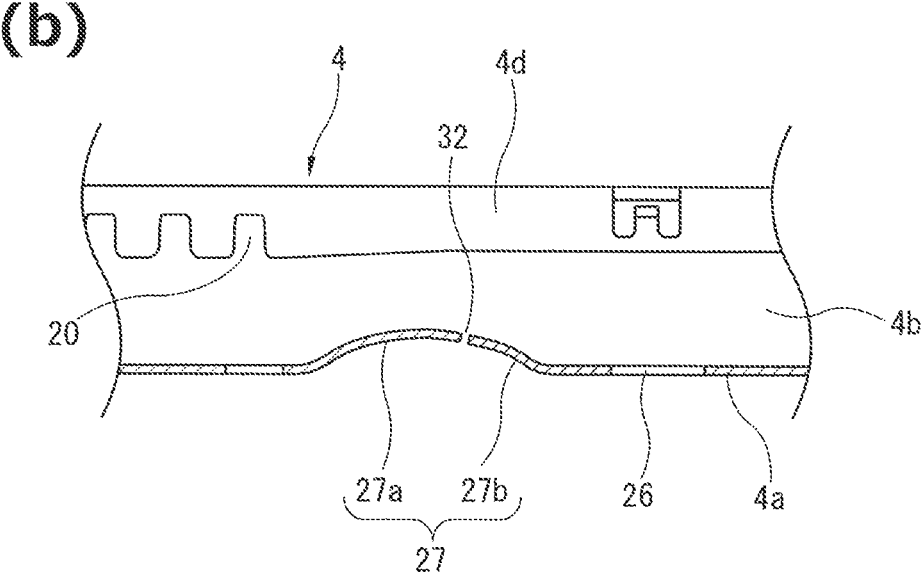

A pair of rear-side stoppers 29 serving as a stroke regulation stopper formed to the bottom wall portion 4*a* of the lower rail 4 is shown in FIG. 7(*a*). Slits for cutting and raising the rear-side stoppers 29 largely extend up to the front sides of the rear-side stoppers 29 over them, so as to be formed as deformed long hole portions 31 surrounding the respective rear-side stoppers 29. The long hole portions 31 largely extend up to the front sides of the rear-side stoppers 29, and consequently, the long hole portions 31 are substantially commonly used with the foreign matter interference portion 27. With this, in the bottom wall portion 4*a* of the lower rail 4, the foreign matter interference portion 27 is formed by being cut and raised along the longitudinal direction, such that an uncut part is left between the pair of the long hole portions 31.

This foreign matter interference portion 27 is formed to be expanded in a substantially gentle circular arc shape so as to be a shape protruding upward after being cut and left in a belt-like shape and in a bridge shape along the longitudinal direction between the pair of the long hole portions 31. This protruding shape is formed by being bent. The rear portion of the foreign matter interference portion 27 is formed in a substantially trapezoidal shape whose width is gradually enlarged toward the rear side thereof.

In addition, a slit 32 is formed at a part more on the rear side than the center part of the total length in the longitudinal direction of the foreign matter interference portion 27, so as to connect the long hole portions 31 with each other. With this, the foreign matter interference portion 27 is separated into a front-side tongue piece 27*a* having a belt-like shape in a cantilever support form and a rear-side tongue piece 27*b* having a substantially trapezoidal shape in a cantilever support form whose length in the longitudinal direction is shorter than that of the front-side tongue piece 27*a*.

Here, although the foreign matter interference portion 27 is cut to be separated into the front-side tongue piece 27*a* and the rear-side tongue piece 27*b*, the free ends of them are positioned on a common circular arc-shape surface without causing a level difference, while facing each other through the slit 32. In addition, as shown in FIG. 2 and FIG. 3, the maximum height position of the foreign matte interference portion 27 is set to a height position substantially equal to that of the head portion 9*a* of the mounting bolt 9.

In addition, as mentioned above, although the foreign matter interference portion 27 is formed so as to be sandwiched between the pair of the long hole portions 31, since the rear-side stoppers 29 are obliquely formed by being cut and raised on the outsides of the pair of the long hole portions 31, sufficient strength and rigidity can be secured around the foreign matter interference portion 27.

Therefore, in the seat slide device 2 in which such a foreign matter interference portion 27 is formed to the lower rail 4, as shown in FIG. 3, the foreign matter interference portion 27 functions to smoothly discharge the foreign matter W, such as a lighter, when the foreign matter W dropped by an occupant enters into the inside of the lower rail 4.

That is, as shown in FIG. 3, in a case where the upper rail 5 is moved backward in a state in which the foreign matter W enters into the inside of the lower rail 4, the foreign matter W runs on the head portion 9*a* of the mounting bolt 9 disposed adjacent to the foreign matter interference portion 27 as an introduction portion, and then is smoothly discharged toward the rear side of the mounting bolt 9 following the backward movement of the upper rail 5. Therefore, even when the upper rail 5 is moved backward, the foreign matter W is not caught between the rear end of the upper rail 5 and the mounting bolt 9, and the obstructing of the backward movement of the upper rail 5 caused by the foreign matter W is suppressed.

In this way, according to the seat slide device 2 of the present embodiment, by forming the foreign matter interference portion 27 integrally with the bottom wall portion 4*a* of the lower rail 4, without losing the function of the foreign matter interference portion 27 due to coming off of the foreign matter interference portion 27, cost can be reduced by reducing the number of components and assembling. In addition, even in a case where the foreign matter W enters into the inside of the lower rail 4, since the foreign matter W can be smoothly discharged, the sliding movement of the upper rail 5 is not obstructed.

In addition, as shown in FIG. 4, the lower rail 4 itself is formed in a substantially U-shape in cross section by the bottom wall portion 4*a* and the side wall portions 4*b* formed on the both sides of the bottom wall portion 4*a*, and is formed to have a sectional shape including the connecting portions 4*c* and the erect wall portions 4*d*. In addition to this, as shown in FIG. 7(*a*), the rear-side stoppers 29 are obliquely formed by being cut and raised so as to be adjacent to the respective long hole portions 31. Consequently, even if the foreign matter interference portion 27 is formed so as to be sandwiched between the two long hole portions 31, sufficient strength and rigidity can be secured around the foreign matter interference portion 27 in the lower rail 4.

Moreover, since the rear-side tongue piece 27*b* forming a part of the foreign matter interference portion 27 is formed in a substantially trapezoidal shape whose width gradually increases toward the rear side, strength and rigidity around the foreign matter interference portion 27 is further improved. Therefore, the mounting hole 26 for the mounting bolt 9 as a fixing member can be arranged adjacent to the foreign matter interference portion 27, on the rear side of the rear-side tongue piece 27*b*. Consequently, in addition to the foreign matter interference portion 27 formed of the front-side tongue piece 27*a* and the rear-side tongue piece 27*b*, the pair of the rear-side stoppers 29 and the mounting hole 26 for the mounting bolt 9 can be collectively arranged to be adjacent to each other, and thereby the degree of freedom of a layout can be enhanced.

Figure 8:
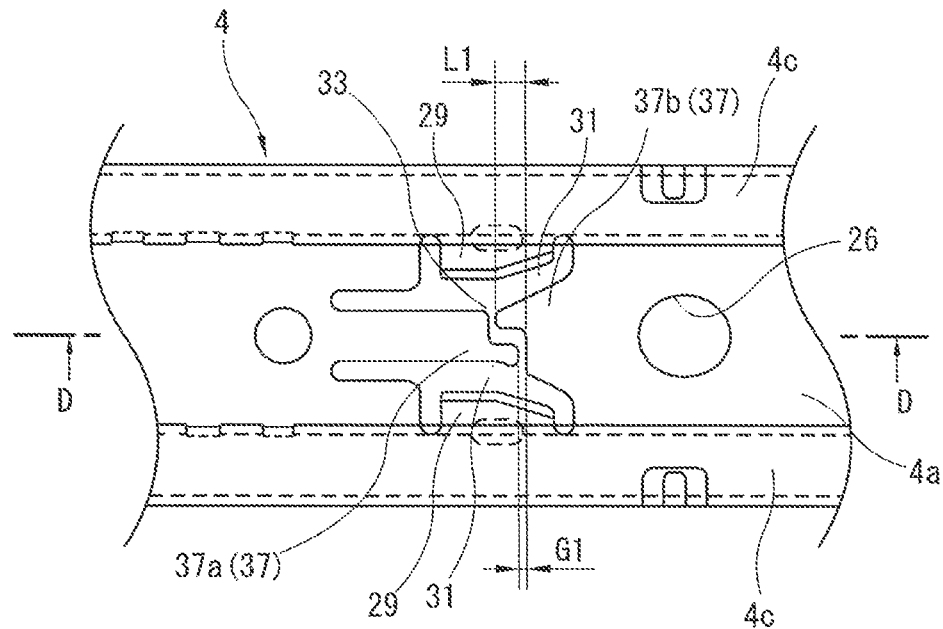
FIG. 8(a) is an enlarged plane view showing the same part as FIG. 7(a) as a second embodiment of the seat slide device according to the present invention.
FIG. 8(b) is a sectional view taken along a line D-D of FIG. 8(a).
Figure 8:
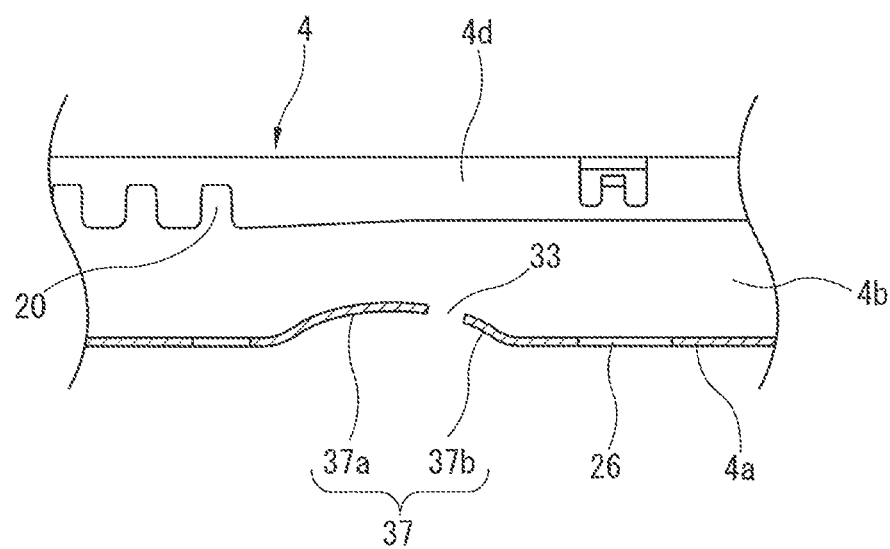

FIG. 8(*a*) and FIG. 8(*b*) show a second embodiment of the seat slide device according to the present invention, and show the same part as FIG. 7(*a*) and FIG. 7(*b*). In addition, the same symbols of FIG. 7(*a*) and FIG. 7(*b*) are applied to the same components of FIG. 8(*a*) and FIG. 8(*b*).

In the second embodiment of FIG. 8(*a*) and FIG. 8(*b*), the shape of a slit 33 cutting and separating a foreign matter interference portion 37 into a front-side tongue piece 37*a* and a rear-side tongue piece 37*b* is different from that shown in FIG. 7(*a*) and FIG. 7(*b*).

The slit 33 in the foreign matter interference portion 37 shown in FIG. 8(*a*) and FIG. 8(*b*) is formed in a crank shape in a plane view. Consequently, the facing end surfaces of the free ends of the front-side tongue piece 37a and the rear-side tongue piece 37b are formed in L-shapes facing in the directions opposite to each other, and the facing end surface of the front-side tongue piece 37a faces the facing end surface of the rear-side tongue piece 37b through a space corresponding to the width of the slit 33, such that their facing end surfaces are fit to each other in a projection and recess relationship. In addition, in the facing end surfaces of the front-side tongue piece 37a and the rear-side tongue piece 37b, a projection length L1 of a projection part is set so as to be sufficiently longer than a width dimension (space) G1 in the longitudinal direction of the slit 33.

Therefore, in the second embodiment, the same effect as the first embodiment can be obtained, and even if the space G1 corresponding to the width of the slit 33 is enlarged in the longitudinal direction, the facing end surfaces of the front-side tongue piece 37a and the rear-side tongue piece 37b face each other so as to be fit in a projection and recess relationship. Therefore, the foreign matter interference portion 37 having an upward circular-arc shape is not disconnected through a space equal to or greater than the width dimension in the longitudinal direction of the slit 33.

For example, such a structure is advantageous specifically when the projection length of the circular-arc foreign matter interference portion 37 having a shape projecting upward is set long in accordance with the height of the head portion 9a of the mounting bolt 9 shown in FIG. 2 and FIG. 3. In addition, even if the upward projection length becomes large, a necessary and sufficient discharge effect of the foreign matter W can be expected.

Figure 9:
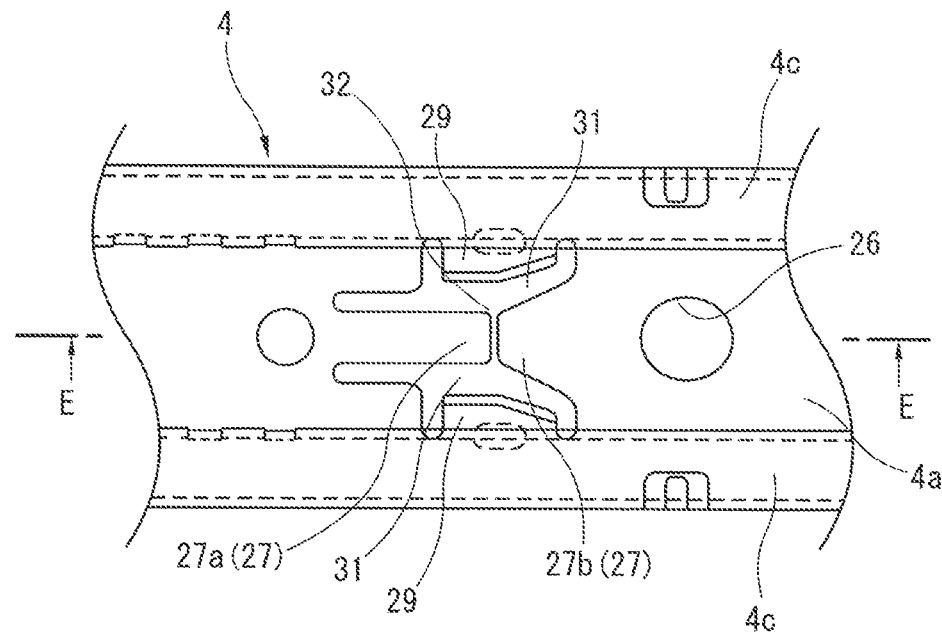
FIG. 9(a) is an enlarged plane view showing the same part as FIG. 7(a) as a third embodiment of the seat slide device according to the present invention.
FIG. 9(b) is a sectional view taken along a line E-E of FIG. 9(a).
Figure 9:
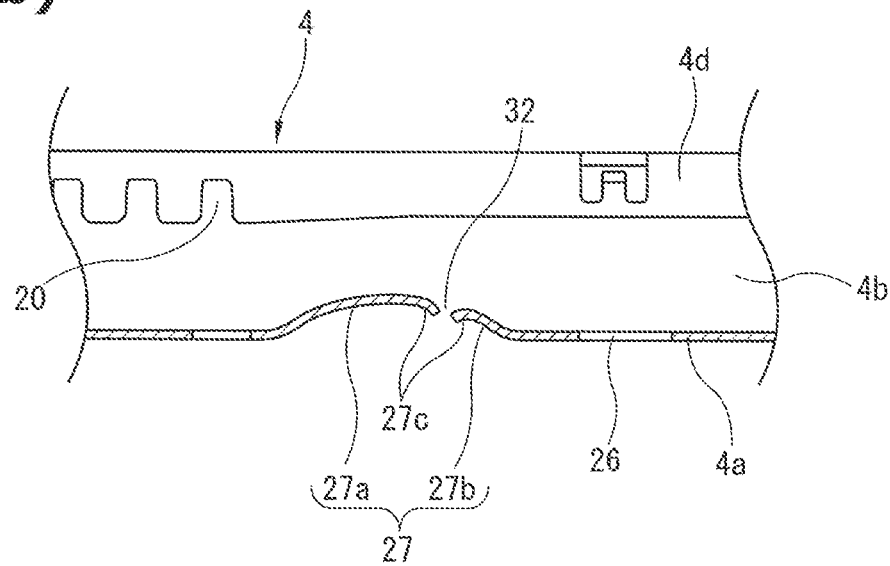

FIG. 9(a) and FIG. 9(b) show a third embodiment of the seat slide device according to the present invention, and show the same part as FIG. 7(a) and FIG. 7(b). In addition, the same symbols of FIG. 7(a) and FIG. 7(b) are applied to the same components of FIG. 9(a) and FIG. 9(b).

The third embodiment shown in FIG. 9(a) and FIG. 9(b) is different from the embodiment shown in FIG. 7(a) and FIG. 7(b) in that, in a foreign matter interference portion 27, the end portions including the facing end surfaces of a front-side tongue piece 27a and a rear-side tongue piece 27b facing each other through a slit 32 are each formed in a curved shape formed by being bent downward as a bent piece portion 27c.

In this third embodiment, the same effect as the first embodiment can be obtained, and the edge portions of the facing end surfaces in the front-side tongue piece 27a and the rear-side tongue piece 27b are not exposed to the circular-arc surface on the upper surface of the foreign matter interference portion 27. Therefore, for example, when a foreign matter W which runs on the foreign matter interference portion 27 moves while sliding, it is not caught by the edge portions. Consequently, the discharging of the foreign matter W toward the rear side can be further smoothly carried out.

The following summarizes features of the present embodiments.

A seat slide device (2) for a vehicle includes: a lower rail (4) having a substantially U-shape in cross section whose front and rear end portions in a longitudinal direction thereof are fixed to a vehicle body by fixing members (9, 10, 11) and whose upper surface is opened; an upper rail (5) fitted to the lower rail (4) so as to be slidably movable in the longitudinal direction; a lock mechanism (13) used for locking and unlocking a position of the upper rail (5) at a time of a positional adjustment of the upper rail (5) with respect to the lower rail (4); and stroke regulation stoppers (28, 29) for regulating a positional adjustment range of the upper rail (5) with respect to the lower rail (4), wherein, in a bottom wall portion (4a) of the lower rail (4), a foreign matter interference portion (27, 37) protruding upward and having a substantially arc-circular shape in a side view is formed by being cut and raised in a middle part in a rail width direction more on a front side than a fixing member (9) for fixing a rear end portion of the lower rail (4) to the vehicle body, and wherein the foreign matter interference portion (27, 37) is separated into a front-side tongue piece (27a, 37a) and a rear-side tongue piece (27b, 37b).

As a preferable aspect for securing sufficient strength and rigidity of the lower rail (4) in which the foreign matter interference portion (27, 37) is formed, a pair of long hole portions (31) extending in the longitudinal direction is formed in the middle part in the rail width direction more on a front side than the fixing member (9) for fixing the rear end portion of the lower rail (4) to the vehicle body, and the foreign matter interference portion (27, 37) is formed by being cut and left between the pair of the long hole portions (31).

For the same reason, as a preferable aspect, the foreign matter interference portion (27, 37) is separated into the front-side tongue piece (27a, 37a) and the rear-side tongue piece (27b, 37b) at a part more on a rear side than a middle part in the longitudinal direction of the foreign matter interference portion (27, 37), and the rear-side tongue piece (27b, 37b) is formed in a shape whose width is gradually enlarged in the rail width direction toward a rear side of the lower rail (4).

Moreover, for the same reason, as a preferable aspect, in the rail width direction of the lower rail (4), stroke regulation stoppers (29) are provided on outer sides of the pair of the long hole portions (31).

As a preferable aspect in a smooth foreign matter discharging effect by the foreign matter interference portion (27, 37), the front-side tongue piece (37a) and the rear-side tongue piece (37b) forming the foreign matter interference portion (37) are separated from each other by a slit (33) which separates facing end portions of them from each other, and the slit (33) is formed in a crank shape in a plane view.

As a further preferable aspect in a smooth foreign matter discharging effect by the foreign matter interference portion (27, 37), facing end portions of the respective front-side tongue piece (27a) and rear-side tongue piece (27b) are bent downward.

The entire contents of Japanese Patent Application 2018-202400 filed Oct. 29, 2018 are incorporated herein by reference.

Although the invention has been described above by reference to certain embodiments of the invention, the invention is not limited to the embodiments described above. Modifications and variation of the embodiments described above will occur to those skilled in the art in light of the above teachings. The scope of the invention is defined with reference to the following claims.

The invention claimed is:

1. A seat slide device for a vehicle, comprising:
a lower rail having a substantially U-shape in cross section whose front and rear end portions in a longitudinal direction thereof are fixed to a vehicle body by a front-end fixing member and a rear-end fixing member respectively, and whose upper surface is opened;
an upper rail fitted to the lower rail so as to be slidably movable in the longitudinal direction;

a lock mechanism used for locking and unlocking a position of the upper rail at a time of a positional adjustment of the upper rail with respect to the lower rail; and stroke regulation stoppers for regulating a positional adjustment range of the upper rail with respect to the lower rail, wherein, in a bottom wall portion of the lower rail, a foreign matter interference portion protruding upward and having a substantially arc-circular shape in a side view is formed on the lower rail, by being cut and raised in a middle part in a rail width direction, on a front side of the rear-end fixing member, and wherein the foreign matter interference portion is separated into a front-side tongue piece and a rear-side tongue piece.

2. The seat slide device for the vehicle according to claim 1, wherein, in the bottom wall portion of the lower rail, a pair of long hole portions extending in the longitudinal direction is formed in the middle part in the rail width direction on the front side of the rear-end fixing member, and wherein the foreign matter interference portion is formed by being cut and left between the pair of the long hole portions.

3. The seat slide device for the vehicle according to claim 2, wherein the foreign matter interference portion is separated into the front-side tongue piece and the rear-side tongue piece at a part on a rear side of a middle part in the longitudinal direction of the foreign matter interference portion, and wherein the rear-side tongue piece is formed in a shape whose width is gradually enlarged in the rail width direction toward a rear side of the lower rail.

4. The seat slide device for the vehicle according to claim 2, wherein, in the rail width direction of the lower rail, the stroke regulation stoppers are provided on outer sides of the pair of the long hole portions.

5. The seat slide device for the vehicle according to claim 3, wherein the front-side tongue piece and the rear-side tongue piece forming the foreign matter interference portion are separated from each other by a slit which separates facing end portions of them from each other, and wherein the slit is formed in a crank shape in a plane view.

6. The seat slide device for the vehicle according to claim 3, wherein facing end portions of the respective front-side tongue piece and rear-side tongue piece are bent downward.

* * * * *